(12) United States Patent
Hejdeman et al.

(10) Patent No.: US 6,816,022 B2
(45) Date of Patent: Nov. 9, 2004

(54) OSCILLATOR SYSTEM AND METHOD FOR STARTING AND STOPPING AN OSCILLATOR

(75) Inventors: Carl Hejdeman, Basingstoke (GB); Andrew McKnight, Southampton (GB); Victor Marten, Flushing, NY (US)

(73) Assignee: Semtech Corporation, Camarillo, CA (US)

( * ) Notice: Subject to any disclaimer, the term of this patent is extended or adjusted under 35 U.S.C. 154(b) by 30 days.

(21) Appl. No.: 10/248,176

(22) Filed: Dec. 23, 2002

(65) Prior Publication Data

US 2003/0090331 A1 May 15, 2003

Related U.S. Application Data

(63) Continuation-in-part of application No. 10/048,704, filed as application No. PCT/US01/02758 on Jan. 27, 2001, now Pat. No. 6,501,342.
(60) Provisional application No. 60/381,362, filed on May 17, 2002, and provisional application No. 60/178,887, filed on Jan. 28, 2000.

(51) Int. Cl.[7] ................................................. H03B 1/00
(52) U.S. Cl. .......................... 331/74; 331/143; 331/173; 713/322; 327/291; 327/299
(58) Field of Search .......................... 331/74, 143, 173; 713/322; 327/291, 299

(56) References Cited

U.S. PATENT DOCUMENTS 5,982,246 A   11/1999  Hofhine et al.

*Primary Examiner*—Arnold Kinkead
(74) *Attorney, Agent, or Firm*—Oppedahl & Larson LLP

(57) ABSTRACT

An improved oscillator system has a control logic block which has an input from an external device to which clock is being provided. The input controls a counter which counts cycles from the oscillator. If some predetermined number of cycles has passed in the absence of a predetermined input condition, then the oscillator halts, thus reducing power consumption by the oscillator system. Later, upon the predetermined input condition, the oscillator resumes oscillation. The system has improved noise immunity and permits a continuous-oscillation mode without the need of an extra pin or memory bit. The control logic block may also employ a counter which counts the number of times the predetermined input condition has occurred, and only after some predetermined number of occurrences does the oscillator-halting activity take place.

35 Claims, 2 Drawing Sheets

OSCILLATOR SYSTEM AND METHOD FOR STARTING AND STOPPING AN OSCILLATOR

CROSS REFERENCE TO RELATED APPLICATIONS

This application is a continuation in patent U.S. application Ser. No. 10/048,704, filed Oct. 26, 2001, now U.S. Pat. No. 6,501,342 issued Dec. 31, 2002, which is the U.S. national stage of international patent appl. no. PCT/US01/02758, published in the English language as PCT publication number WO 01/56145, which claims priority from U.S. application Ser. No. 60/178,887, filed Jan. 28, 2000, which applications are hereby incorporated herein by reference. This application also claims priority from U.S. application Ser. No. 60/381,362, filed May 17, 2002, which application is hereby incorporated herein by reference.

BACKGROUND OF INVENTION

The invention relates generally to oscillators and relates more particularly to power conservation in systems relying upon oscillators.

In recent years enormous efforts have been expended to try to save power in battery-powered devices such as personal computers and PDAs (personal digital assistants). The designer of such a system faces the constraint that the system invariably requires at least one oscillator to provide clock signals for clocked circuitry such as a microcontroller or microprocessor. In a typical arrangement the oscillator is external to the microcontroller or microprocessor.

It is well known to conserve power by having the microcontroller or microprocessor go to "sleep" from time to time. For example, if a microcontroller is employed to receive human input at a keyboard or pointing device, it is well known to have the microcontroller go to "sleep" between keystrokes or other input. This may, for example, be carried out as described In U.S. Pat. No. 5,585,792 entitled "Energy-saving keyboard," assigned to the same assignee as the assignee of the present invention, incorporated herein by reference.

The diligent system designer who takes the well-known step of putting a microcontroller to "sleep" during intervals of inactivity will, however, find that even if the microcontroller is put to sleep, an external oscillator will continue to consume power. In a typical duty cycle where the microcontroller is asleep most of the time, such power consumption in the oscillator turns out to be a chief component of the energy budget. Stated differently, if only there were a way to shut down the oscillator during periods of inactivity this could greatly extend battery life.

Experience shows, however, that most of the ways in which one might be tempted to try to shut down an external oscillator have drawbacks. Any of a number of events may prompt the microcontroller to try to awaken, yet an actual awakening of the microcontroller is only able to happen if the oscillator resumes oscillation promptly as well.

It is disclosed in the above-referenced international patent application number PCT/US01/02758 designating the United States, published as PCT publication number WO 01/56145, to provide an external oscillator for a microcontroller (or microprocessor) which makes informed use of a signal from the microcontroller so as to selectively turn the oscillator on and off. When the microcontroller goes to sleep, the oscillator follows by going to sleep. Later when the microcontroller awakens, the oscillator follows by reawakening.

This may be seen, for example, in FIG. 4 of the previously mentioned international patent application, reproduced herein as FIG. 1. An external oscillator circuit such as illustrated in FIG. 1 herein will stop Its oscillation as soon as the clock output 52 from the host microcontroller stops switching.

Experience has shown, however, that externally induced noise on the clock output line 52 may temporarily disable it, which will be erroneously interpreted by the oscillator circuit as the Stop condition. This is an undesirable situation.

A system designer attempting to provide the benefits of a stoppable oscillator may find that the only clock output signal available from a host microcontroller happens to be divided down from the oscillator signal. Stated differently, it may develop that the clock output signal available from the host microcontroller is a lower frequency than the oscillator frequency. It would be desirable to provide an external oscillator which, even in such an application, nonetheless provides power conservation benefits by stopping during most, if not all, of the time that the host microcontroller is sleeping.

The designer of an oscillator system may likewise wish to provide a single-chip oscillator system which is versatile enough not only to provide a selectively stoppable oscillator for power conservation with microcontrollers that sometimes go to sleep, but also to provide an oscillator which would have a continuous oscillator output in other applications. If the oscillator is to provide the latter of these two functionalities, such a mode of operations can be easily controlled by an internal nonvolatile memory/control bit or an extra input control pin. However both of these methods are less then perfect, as a memory bit will require programming, and an extra pin may increase the cost of the device.

Those skilled in the art will also appreciate that nonvolatile memory bits are limited in number and cost money. It is thus desirable to design systems to minimize the number of nonvolatile memory bits required in such systems.

It would thus be extremely helpful if it were possible to provide an oscillator which has some level of immunity from the problem of spurious entry into a "stop" condition even in the face of externally induced noise. It would thus likewise be extremely helpful if it were possible to provide a single-chip oscillator which is versatile enough that it can provide a continuous-operation mode without the need of an extra memory bit or an extra pin for selection of such a mode.

SUMMARY OF INVENTION

An improved oscillator system has a control logic block which has an input from an external device to which clock is being provided. The input controls a counter which counts cycles from the oscillator. If some predetermined number of cycles has passed in the absence of a predetermined input condition, then the oscillator halts, thus reducing power consumption by the oscillator system. Later, upon the predetermined input condition, the oscillator resumes oscillation. The system has improved noise immunity and permits a continuous-oscillation mode without the need of an extra pin or memory bit. The control logic block may also employ a counter which counts the number of times the predetermined input condition has occurred, and only after some predetermined number of occurrences does the oscillator-halting activity take place.

BRIEF DESCRIPTION OF DRAWINGS

The invention will be described with respect to a drawing, of which.

DETAILED DESCRIPTION

Figure 1:
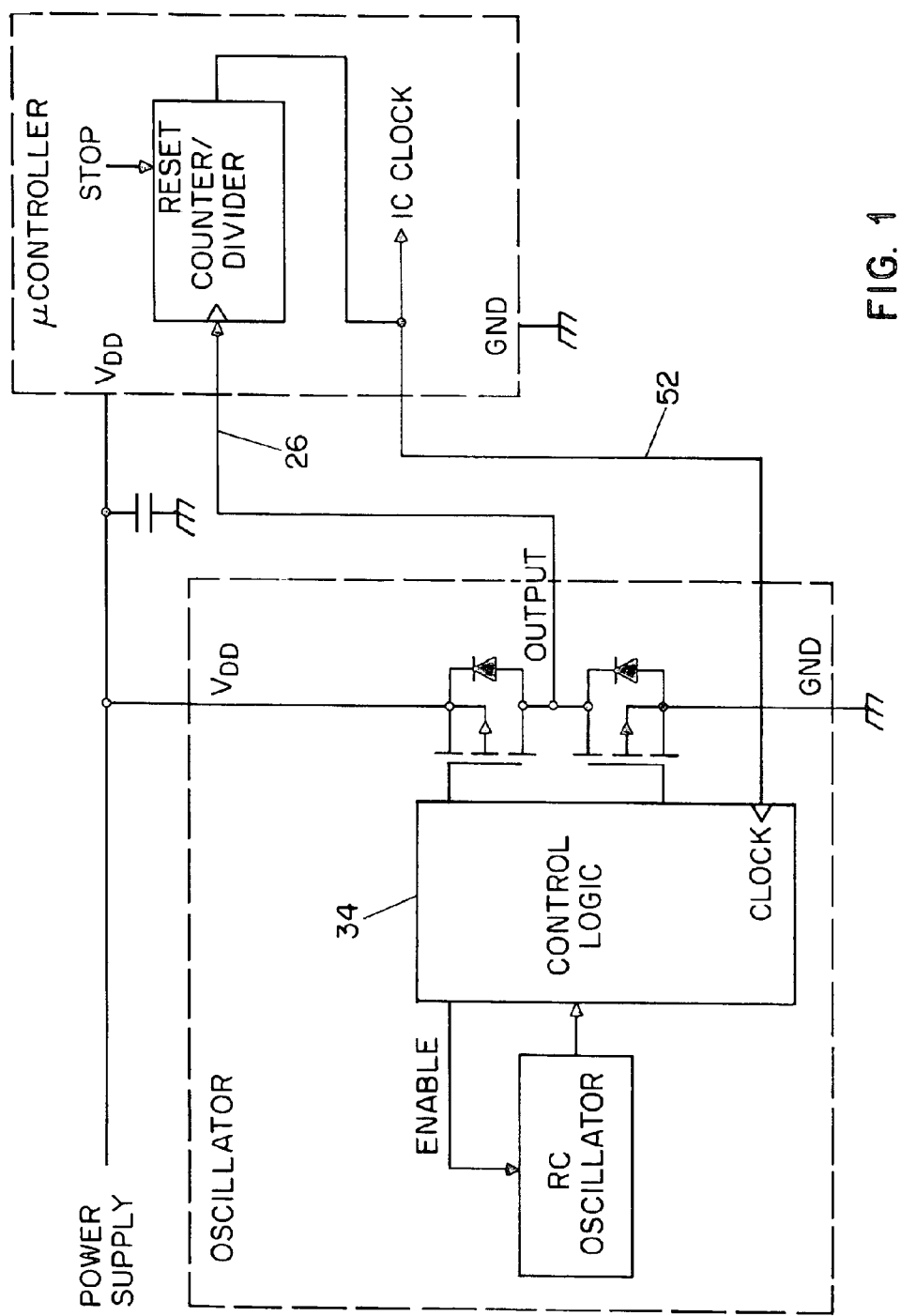
FIG. 1 shows in functional block diagram form an external oscillator connected with a microcontroller.

Noise immunity. As will be described in more detail below, in order to fortify the circuit against the effects of noise, it is proposed to have the control logic block 34 (FIG. 2) Incorporate an edge-sensitive input 113, with further conditioning by an internal counter 104. The circuit permits the clock 103 to be continually output even under conditions where the clock output 52 will not, often and periodically, produce any logic level changes.

The counter 104 In the control logic block 34 may be preset to any useful number "N", such as a power of 2 (2, 4, . . . ,32, 64, . . . , 1024, etc.) for simplicity of implementation. The output clock 26 will only be stopped if the line 52 has not produced any transitions for "N" cycles of the clock of the oscillator 103.

Figure 2:
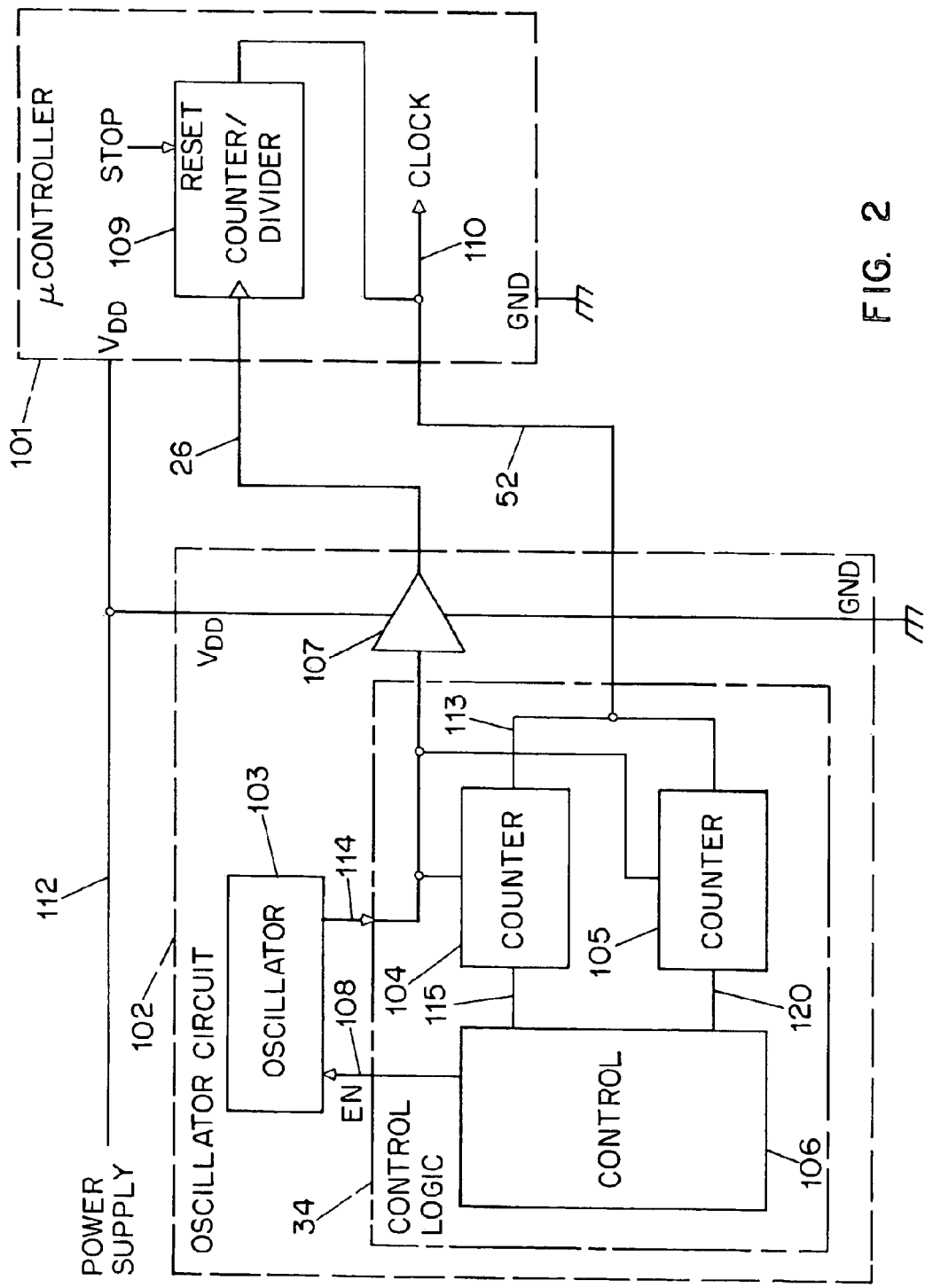
FIG. 2 shows in functional block diagram an external oscillator including features embodying the invention.

Operation with divided-clock output. With an appropriate selection of number "N", the described circuit will also operate with host devices that do not have a direct output of the buffered input clock, but which have only a lower-frequency (divided-down) output as shown in FIG. 2. This may happen because there Is a divider 109 in the device 101. For example, if the divided signal is divided by four (with respect to the oscillator frequency) then N should minimally be at least four, and would preferably be four times some power of two, for example N may be sixteen or 64 or 1024.

Continuous-mode oscillation. It may also be beneficial to not stop the clock 103 at all, if the external oscillator circuit 102 is used in such a way that the clock output should be continuous. As mentioned above, the obvious ways to do this would be (a) by allocating a nonvolatile bit within the chip, the setting of which causes the continuous-mode operation, or (b) by allocating an extra pin which is tied high or low to cause the continuous-mode operation. Instead of either of these approaches, in an exemplary embodiment of the invention, the control logic block 34 is configured so that the oscillator is halted only if some predetermined number of transitions is detected from the clock output line 52. Stated differently, the mode of operations of the external oscillator circuit is switched only if a minimum number of transitions "M" are detected from the clock output line 52. M could be the same as N or could be some smaller or larger number. If the system designer desires uninterrupted operation of the clock, the input pin from line 52 may simply be connected to a stable logic level. This configuration of the control logic block 34 is accomplished, in an exemplary embodiment, by means of a counter 105.

Those skilled in the art will appreciate that the counter 104 and the counter 105 may be distinct from each other. If the two counters are intended to count to different totals M and N with M smaller than N, then gates may be conserved by providing a first counter 1 OS which counts to M, and by providing an additional counter which takes an output from the counter 105 and counts to N–M, the output of which is defined as counter 104. It should also be appreciated that such counters could start at zero and count up to M (or N) or could start at M (or N) and count downwards toward zero.

Returning to FIG. 2, what is shown is an oscillator system 102 comprising an oscillator 103 and control means 34, the oscillator 103 having an output 114 communicated externally (line 26) to the system and to the control means, the oscillator 103 having a control line 108 from the control means, the oscillator 103 responsive to a first state of the control line 108 from the control means 34 by providing an oscillating signal on the output 114 and responsive to a second state of the control line 108 from the control means 34 by providing a constant signal on the output 26. The system has an input 52 communicated externally to the system 102. The control means 34 comprises a counter 104 responsive to the oscillator output 114 for counting cycles thereof, the counter 104 yielding a signal 115 indicative of the event of the number of counted cycles reaching a predetermined number, the counter 104 responsive to the input 52 by resetting itself upon an event regarding the input 52. The control means 34, in the absence of the signal 115 from the counter 104, asserts the first state of the control line 108 to the oscillator 103, and in the event of the signal 115 from the counter 104, asserts the second state of the control line 108 to the oscillator 103. The predetermined number may be a power of two. It may be at least sixteen. It may be at least 1024. The event regarding the Input 52 to which the counter 104 responds may be an edge-sensitive event. The system 102 may be, and is preferably, on a single chip.

Again as shown in FIG. 2, there an be a second counter 105 responsive to the oscillator output 114 for counting cycles thereof. The second counter 105 yields a signal 120 indicative of the event of the number of counted cycles reaching a second predetermined number. The second counter 105 is responsive to the input 52 by resetting itself upon an event regarding the input 52. The control means 106 is responsive to the event of the signal 120 from the second counter 105 by disabling the second state of the control line 108 to the oscillator 103. Stated differently, if line 52 were tied to a stable logic level, the counter 105 would reach its second predetermined number and the oscillator 103 would never get halted. This permits the system 102 to be quite flexible. The system 102 can be used with an external device 101 that sometimes goes to sleep, in which case the system 102 will conserve power as described above. On the other hand, the system 102 can be used with an external device that never goes to sleep, in which case line 52 is tied to a stable logic level, and the oscillator 103 is enabled at all times.

The second predetermined number may be a power of two, or may be at least sixteen, or may be smaller or larger than the first predetermined number associated with the first counter 104. The system 102 including counter 105 may be, and preferably is, on a single chip.

Stated differently, in one embodiment of the invention the mode of operations of the oscillator is switched only if some predetermined minimum number of transitions is detected from the clock output line 52. The number M of such transitions may be the same as N. This parameter is applied to a separate counter 105 in the control logic block 34. M can be smaller than, larger than, or the same as N.

It should be appreciated that the counter 105 simply adds up the number of cycles on line 52, and stops (holding the value) when the count of M is reached. Alternatively, counter 105 is preloaded with the number M and is decremented when the value of zero is reached. When counter 105 has detected M cycles on line 52, the mode of operations changes from "continuous" to "start/stop" and counter 104 is able to control whether the oscillator 103 has an output.

The counter 104 tallies the number of cycles on line 26 while there are no transitions on line 52. Depending on the particular logic implementation, it is reset to zero (or present to a number N) when a transition on line 52 is detected. If over N cycles on line 26 have occurred while there are no transitions on line 52, the clock output on line 26 is halted. The clock output on line 26 will be restarted if at least a single transition on line 52 is detected. The clock 26 will not be shut down again until counter 105 tallies M cycles on line 52.

Those skilled in the art will appreciate that the invention offers its benefit with regard to any system in which sequences of internal states must be developed. Thus, while the invention is described in connection with exemplary embodiments such as microcontrollers or microprocessors, it offers its benefits in any other system requiring a clock, such as a UART (universal asynchronous receiver-transmitter), shift register, or generalized state machine.

What is claimed is:

1. An oscillator system comprising an oscillator and control means, the oscillator having an output communicated external to the oscillator system and to the control means, the oscillator having a control line from the control means, the oscillator responsive to a first state of the control line from the control means by providing an oscillating signal on the output and responsive to a second state of the control line from the control means by providing a constant signal on the output;

the oscillator system having an input communicated externally to the oscillator system;

the control means comprising a first counter responsive to the oscillator output for counting cycles thereof, the first counter yielding a signal indicative of an event of the number of counted cycles reaching a first predetermined number, the first counter responsive to the input by resetting itself upon an event regarding the input;

the control means, in the absence of the signal from the first counter, asserting the first state of the control line to the oscillator, and in the event of the signal from the first counter, asserting the second state of the control line to the oscillator.

2. The system of claim 1 wherein the first predetermined number is a power of two.

3. The system of claim 1 wherein the first predetermined number is at least sixteen.

4. The system of claim 1 wherein the first predetermined number is at least 1024.

5. The system of claim 1 wherein the event regarding the input to which the counter responds is an edge-sensitive event.

6. The system of claim 1 wherein the oscillator system is on a single chip.

7. The system of claim 1 further comprising an integrated circuit dependent upon an external clock signal at a clock terminal, the clock terminal connected with the oscillator output.

8. The system of claim 7 wherein the integrated circuit is a microcontroller.

9. The system of claim 1 wherein the oscillator is an RC oscillator.

10. The system of claim 1 in which the control means further comprises a second counter responsive to the oscillator output for counting cycles thereof, the second counter yielding a signal indicative of an event of number of counted cycles reaching a second predetermined number, the second counter responsive to the input by resetting itself upon an event regarding the input;

the control means responsive to the event of the signal from the second counter by disabling the second state of the control line to the oscillator.

11. The system of claim 10 wherein the second predetermined number is a power of two.

12. The system of claim 10 wherein the second predetermined number is at least sixteen.

13. The system of claim 10 wherein the second predetermined number is smaller than the first predetermined number.

14. The system of claim 10 wherein the second predetermined number is larger than the first predetermined number.

15. The system of claim 10 wherein the second predetermined number is the same as the first predetermined number.

16. The system of claim 10 wherein the event regarding the input to which the counter responds is an edge sensitive event.

17. The system of claim 10 wherein the system is on a single chip.

18. The system of claim 10 further comprising an integrated circuit dependent upon an external clock signal at a clock terminal, the clock terminal connected with the oscillator output.

19. The system of claim 18 wherein the integrated circuit is a microcontroller.

20. The system of claim 10 wherein the oscillator is an RC oscillator.

21. The system of claim 10 wherein the first and second counters are distinct from each other.

22. A method performed with respect to an oscillator system having an output and an input, the method comprising the steps of:

oscillating thereby yielding oscillations;

providing a signal indicative of the oscillation to the output;

counting the oscillations, yielding a first count of oscillations;

resetting the first count upon receipt of a predetermined event at the input; and halting the oscillating upon the first count reaching a first predetermined number.

23. The method of claim 22 wherein the first predetermined number is a power of two.

24. The method of claim 22 wherein the first predetermined number is at least sixteen.

25. The method of claim 22 wherein the first predetermined number is at least 1024.

26. The method of claim 22 wherein the event regarding the input is an edge sensitive event.

27. The method of claim 22 further comprising the event, performed after the halting step, of resuming the oscillating upon receipt of the predetermined event at the input.

28. The method of claim 22 wherein the counting of oscillations also yields a second count of oscillations, the method further comprising the steps of:

resetting the second count upon receipt of the predetermined event at the input;

performing the halting step only after the event of the second count reaching a second predetermined number.

29. The method of claim 28 in which the second predetermined number is smaller than the first predetermined number.

30. The method of claim 28 in which the second predetermined number is larger than the first predetermined number.

31. The method of claim 28 in which the second predetermined number is the same as the first predetermined number.

32. A method performed with respect to an oscillator system having an output and an input, the method comprising the steps of:

oscillating thereby yielding oscillations;

providing a signal indicative of the oscillation to the output;

counting the oscillations, yielding a first count of oscillations;

resetting the first count upon receipt of a predetermined event at the input; and halting the oscillating upon the first count reaching a first predetermined number;

wherein the counting of oscillations also yields a second count of oscillations, the method further comprising the steps of:

resetting the second count upon receipt of the predetermined event at the input;

performing the halting step only after the event of the second count reaching a second predetermined number.

33. The method of claim 32 in which the second predetermined number is smaller than the first predetermined number.

34. The method of claim 32 in which the second predetermined number is larger than the first predetermined number.

35. The method of claim 32 in which the second predetermined number is the same as the first predetermined number.

* * * * *